United States Patent
Kamiya et al.

(10) Patent No.: US 6,814,203 B2
(45) Date of Patent: Nov. 9, 2004

(54) STATOR WITH ONE-WAY CLUTCH

(75) Inventors: Taiji Kamiya, Fukuroi (JP); Hirobumi Shirataki, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/456,754

(22) Filed: Jun. 9, 2003

(65) Prior Publication Data

US 2003/0226732 A1 Dec. 11, 2003

(30) Foreign Application Priority Data

Jun. 10, 2002 (JP) ...................................... 2002-168577

(51) Int. Cl.⁷ ............................................. F16D 41/07
(52) U.S. Cl. ................................. 192/45.1; 192/110 B
(58) Field of Search ........................... 192/45.1, 41 A, 192/110 B; 60/345

(56) References Cited

U.S. PATENT DOCUMENTS

| | | | | |
|---|---|---|---|---|
| 4,911,273 A | * | 3/1990 | Kinoshita et al. | ......... 192/41 A |
| 5,570,766 A | * | 11/1996 | Sato et al. | ................. 192/45.1 |
| 5,642,795 A | * | 7/1997 | Miura et al. | ................ 192/45.1 |
| 6,189,671 B1 | * | 2/2001 | Le Calve et al. | ....... 192/113.32 |
| 2002/0153217 A1 | * | 10/2002 | Sato | .......................... 192/45.1 |

FOREIGN PATENT DOCUMENTS

| | | | |
|---|---|---|---|
| EP | 0549824 A1 | * 7/1993 | ........... F16H/41/24 |
| JP | 8326866 A | 12/1996 | |
| JP | 20011323985 A | 11/2001 | |

* cited by examiner

Primary Examiner—Richard M. Lorence
(74) Attorney, Agent, or Firm—Crowell & Moring LLP

(57) ABSTRACT

A stator is provided with an impeller and a one-way clutch. The stator includes at least one plain bearing and at least one side plate. The plain bearing is arranged adjacent to and on an axially outer side of a side portion of the one-way clutch and between an inner ring and an outer ring of the one-way clutch, and on its inner and outer peripheries, has flanges with bearing tracks formed thereon. The side plate is arranged on an axially outer side of the plain bearing and at a position adjacent to the plain bearing such that the side plate serves not only as a stopper for the plain bearing but also as a bearing track for a needle bearing. The plain bearing and side plate are provided with engageable portions, respectively, and are maintained in engagement with each other via the engageable portions.

6 Claims, 3 Drawing Sheets

STATOR WITH ONE-WAY CLUTCH

BACKGROUND OF THE INVENTION a) Field of the Invention

This invention relates to a stator, which is provided with a one-way clutch and is useful in a torque converter.

b) Description of the Related Art

In FIG. 4, a conventional stator 10 provided with a one-way clutch is shown. In the drawing, numeral 21 indicates an impeller of the stator 10, while numeral 22 designates a radially-inner, cylindrical part of the impeller. On an inner periphery of the radially-inner, cylindrical part 22, a one-way clutch 30 is arranged. Designated at numerals 31,32 are an outer ring and an inner ring of the one-way clutch 30, respectively. The outer and inner rings 31,32 are both rotatably supported on bushes 35. Aluminum alloys have been used primarily as materials of such bushes in order to allow the bushes to exhibit a bearing function. The bushes 35 also serve as bearing tracks for needle bearings 40 disposed on axially-outer sides of the one-way clutch 30, respectively. These bushes 35 are provided with lubrication holes to supply lube oil to the one-way clutch.

FIG. 4 also shows splines 33, via which the inner ring 32 is secured on a central fixing part (not illustrated) of the stator 10, and a central axis X—X of the stator 10.

In the conventional stator 10 of FIG. 4, each bush 35, as a single-piece part, functions as a bearing for supporting the inner and outer rings 32,31 of the one-way clutch 30, and also as a back-up member for a side plate of the one-way clutch 30 and for the needle bearing 40. Each bush 35 is also provided at its rolling surface for the corresponding needle bearing 40 with oil grooves for cooling the needle bearing. Because each bush 35 is a single-piece part, it is necessary to make the bush with a bearing alloy in its entirety and then to form grooves and ridges by cutting. As a corollary to this, such bushes are relatively expensive. With such a conventional construction as described above, the aluminum-made bushes are required to be dimensioned large in thickness to provide them with strength as high as needed.

As another example, end bearings are used to rotatably support an inner ring and an outer ring of a one-way clutch, and lock plates are employed to support the one-way clutch at side portions thereof via the lock plates, respectively. This example, however, involves a problem in that any attempt to shorten the axial length of the one-way clutch makes it difficult to machine resilient pieces, which are required to produce an outer cage drag, into cages.

SUMMARY OF THE INVENTION

To solve the above-described problem, an object of the present invention is to provide at low cost a stator having a reduced dimension in an axial direction by improving bearings of a one-way clutch and support structures for side portions of the one-way clutch.

According to one aspect of the present invention, a stator is provided with an impeller and a one-way clutch arranged in a radially-inner part of the impeller. The stator comprises at least one plain bearing and at least one side plate arranged on an axially outer side of the plain bearing. The plain bearing is arranged adjacent to and on an axially outer side of a side portion of the one-way clutch and between an inner ring and an outer ring of the one-way clutch, and on inner and outer peripheries thereof, having flanges with bearing tracks formed thereon, respectively. The side plate is arranged at a position adjacent to the plain bearing such that the side plate serves not only as a stopper for the plain bearing but also as a bearing track for a needle bearing disposed on an axially-outer side of the side plate. The plain bearing and the side plate are provided with engageable portions, respectively, and are maintained in engagement with each other via the engageable portions.

Preferably, the stator may further comprises an additional plain bearing and side plate as defined above, which are arranged on an axially outer side of an opposite side portion of said one-way clutch such that said additional plain bearing and side plate are maintained in engagement with each other via engageable portions thereof.

Where the plain bearing and side plate are arranged on the axially outer side of only one of the side portions of the one-way clutch, the other side portion of the one-way clutch can be supported by a known method. As disclosed in JP 2001-323985 A, for example, a radially inner, cylindrical part of an impeller can be extended inwardly in a radial direction such that the thus-extended portion, on its inner surface, is maintained in sliding contact with an outer ring and also rotatably supports a side portion of the one-way clutch, and on its outer surface, rotatably supports a needle bearing.

As the stator according to the present invention is constructed as described above, the provision of the plain bearing and the side plate as discrete members and the arrangement of the plain bearing in engagement with its corresponding side plate have made it possible to provide the stator with a reduced dimension in the axial direction. Further, the plain bearing and side plate can be formed at low cost by subjecting plate-shaped blanks to pressing which is an easy machining method. When these plain bearing and side plate are arranged in a form engaged with each other via the engageable portions, they can show performance at least comparable with conventional bearings although the stator is available at low cost.

DETAILED DESCRIPTION OF THE INVENTION AND PREFERRED EMBODIMENTS

Figure 1:
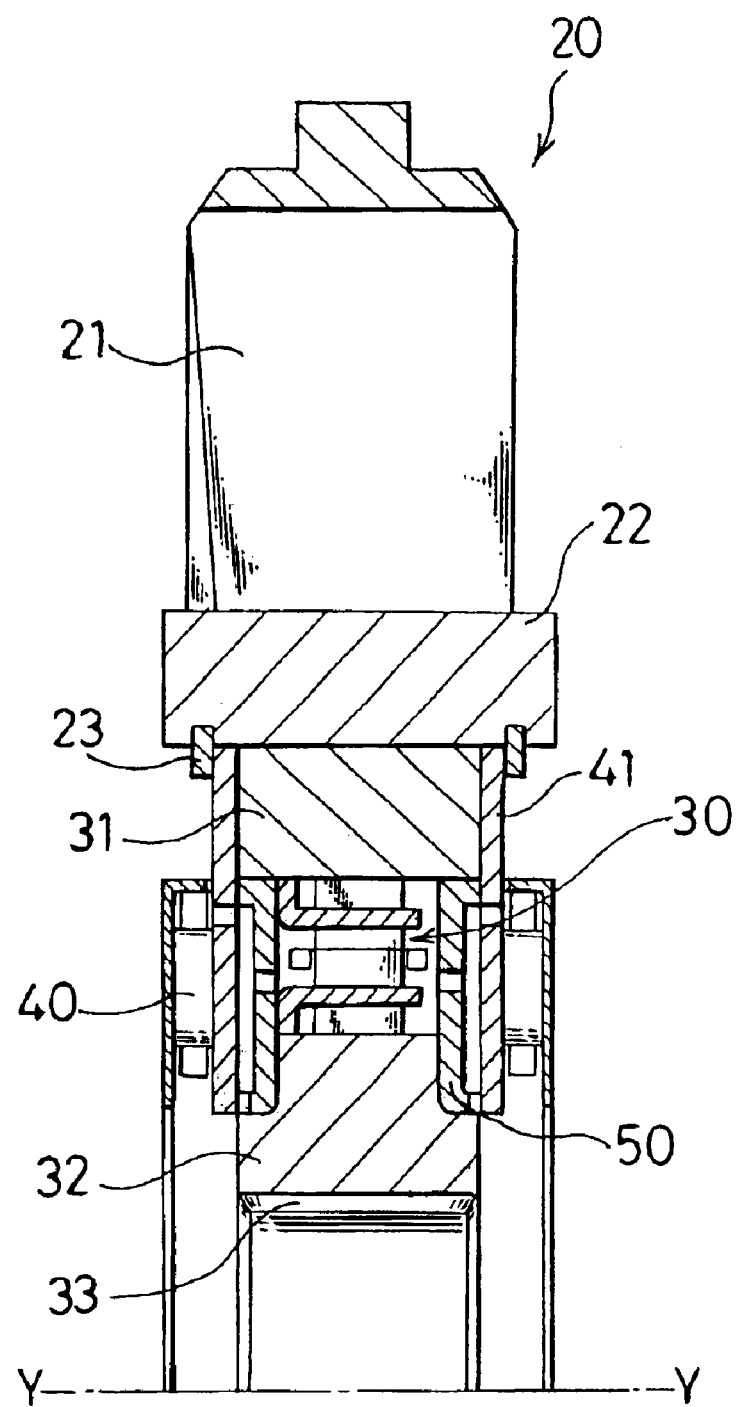
FIG. 1 is a side cross-sectional view of a stator according to one embodiment of the present invention, said stator being provided with a one-way clutch.
Figure 2:
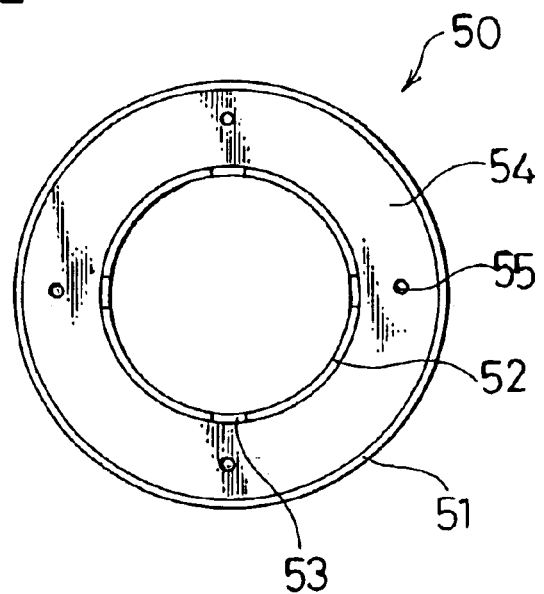
FIG. 2 is a front view of a plain bearing.
Figure 3:
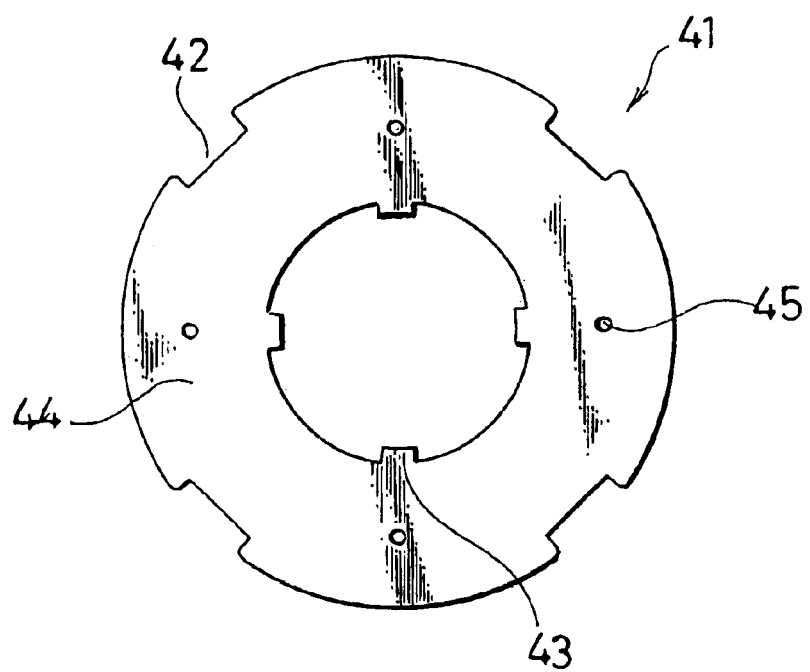
FIG. 3 is a front view of a side plate.
Figure 4:
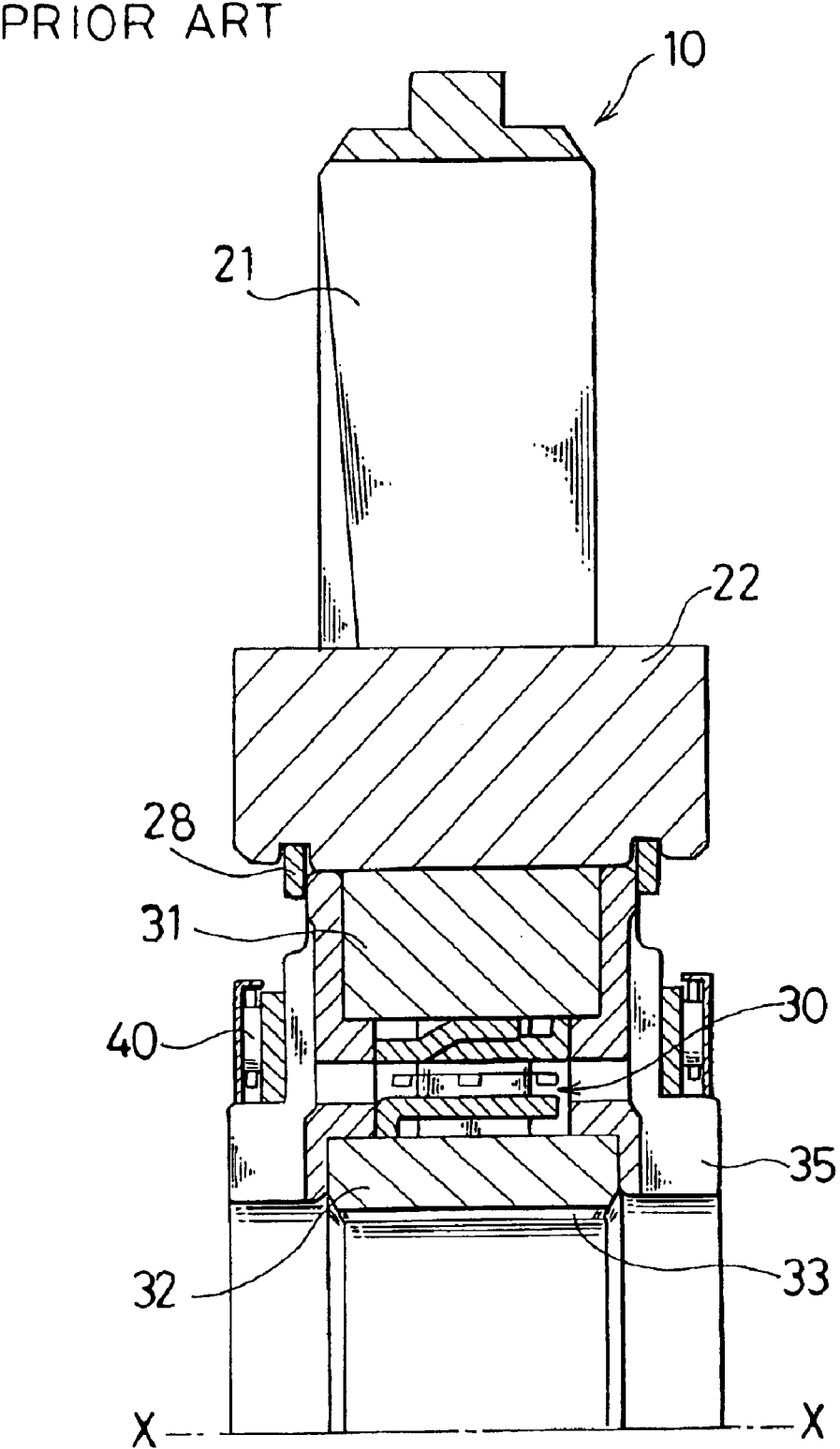
FIG. 4 is a side cross-sectional view of a conventional stator provided with a one-way clutch.

With reference to FIG. 1 to FIG. 3, the stator according to the one embodiment of the present invention will hereinafter be described. The stator, which is designated generally by numeral 20 and is useful in a torque converter, has an impeller 21 secured on a radially inner, cylindrical part 22. Arranged between the radially inner, cylindrical part 22 and a central fixing part (not shown) is the one-way clutch which is designated at numeral 30. There are also illustrated an outer ring 31 and an inner ring 32 of the one-way clutch 30, splines 33 on the inner ring 32, and a central axis Y—Y. The splines 33 are in engagement with the central fixing part.

The outer ring 31 and the inner ring 32 are supported by plain bearings 50. In the present invention, the plain bearings 50 and the side plates 41 are arranged as discrete members in place of bushes, and the plain bearings 50 are arranged in engagement with their corresponding side plates 41. As illustrated in FIG. 1 and FIG. 2, each plain bearing 50 is provided with an outer flange 51 and an inner flange 52, and is constructed such that it approximately has a turned, square U-shaped configuration in cross-section. These plain bearings 50 are arranged adjacent to and on axially-outer sides of side portions of the one-way clutch 30, respectively. These outer and inner flanges 51,52 serve as bearings for the outer and inner rings 31,32, respectively. The inner flange 52 is provided with notches 53 formed by partially cutting off the inner flange. These notches 53 are brought into engagement with engagement tabs 43 on the corresponding side plate 41 to be described subsequently herein. Through a radially-extending wall portion 54 of the plain bearing 50, lubrication holes 55 are arranged extending in an axial direction.

As shown in FIG. 1 and FIG. 3, each side plate 41 is equipped with a function to serve as a race for its corresponding needle bearing 40. The side plate 41 is provided on a side of its inner periphery with the engagement tabs 43 which are engageable with the notches 53 of the corresponding plain bearing 50, respectively. To supply lube oil to the one-way clutch 30, lubrication holes 45 are arranged extending through the side plate 41 in the axial direction. These lubrication holes 45 open in an outer surface 44 of the side plate 41. This outer surface 44 allows cylindrical rollers of the needle bearing 40 to rotate thereon, in other words, has a function to serve as a race for the needle bearing. Notches 42, which are arranged on an outer periphery of the side plate 41, are brought into engagement with tabs or the like (not shown) arranged on the radially inner, cylindrical part 22 of the impeller so that the side plate 41 is fixed to prevent rotation in a peripheral direction. The notches 53 and their corresponding engagement tabs 43 are formed such that lube oil is allowed to enter through openings between the notches 53 and the engagement tabs 43 so engaged.

As described above, each side plate 41 and its corresponding plain bearing 50 are kept in engagement with each other at the engagement tabs 43 and the notches 53, are arranged between the radially inner, cylindrical part 22 and the inner ring 32 of the one-way clutch and between the outer ring 31 and the inner ring 32 of the one-way clutch, respectively, and are fixed by a corresponding stopper ring 23 such that they do not move in the axial direction. As the side plates 41 are secured on the radially inner, cylindrical part 22 of the impeller 21 as mentioned above, the impeller 21, the side plates 41 and the plain bearings 50 are fixed together as an integral unit. Owing to the above-described construction, lube oil which is circulating through a torque converter is allowed to flow, through the openings between the notches 53 and the engagement tabs 43 engaged with each other, into spaces formed between the inner flanges 52 and their corresponding outer flanges 51 of the plain bearings 50, respectively, to flow into the one-way clutch 30 through the lubrication holes 55 arranged in the plain bearings 50, and then to flow out through the lubrication holes 45 in the side plates 41 such that the rolling surfaces for the corresponding needle bearings 50 can be cooled. It is, therefore, possible to avoid labor which would otherwise be required to cut oil grooves.

Preferably, the plain bearings are made of a copper-base or aluminum-base, metal material. Illustrative metal materials can be divided roughly into bimetal bearing materials and solid bearing metal materials. These bimetal bearing materials are primarily double-layered alloy or metal strips each of which is formed of a bearing alloy or metal and a backing metal bonded together. Usable examples of the bearing alloy or metal can include aluminum alloys, phosphor bronze, leaded bronze and high-lead bronze, while usable examples of the backing metal can include steel, cast iron and bronze. They can be combined as desired. On the other hand, usable examples of the solid bearing metal materials can include aluminum alloys and copper alloys.

This application claims the priority of Japanese Patent Application 2002-168577 filed Jun. 10, 2002, which is incorporated herein by reference.

What is claimed is:

1. A stator provided with an impeller and a one-way clutch arranged in a radially-inner part of said impeller, comprising:

at least one plain bearing arranged adjacent to and on an axially outer side of a side portion of said one-way clutch and between an inner ring and an outer ring of said one-way clutch, and on inner and outer peripheries thereof, having flanges with bearing tracks formed thereon, respectively, and at least one side plate arranged on an axially outer side of said plain bearing and at a position adjacent to said plain bearing such that said side plate serves not only as a stopper for said plain bearing but also as a bearing track for a needle bearing disposed on an axially-outer side of said side plate;

wherein said plain bearing and said side plate are provided with engageable portions, respectively, and are maintained in engagement with each other via said engageable portions.

2. A stator according to claim 1, wherein said plain bearing and said side plate are each provided with at least one lubrication hole extending axially therethrough.

3. A stator according to claim 1, wherein said plain bearing is made of a metal material selected from the group consisting of copper-base metal materials and aluminum-base metal materials.

4. A stator according to claim 1, further comprising an additional plain bearing and side plate as defined in claim 1, which are arranged on an axially outer side of an opposite side portion of said one-way clutch such that said additional plain bearing and side plate are maintained in engagement with each other via engageable portions thereof.

5. A stator according to claim 4, wherein said plain bearings and said side plates are each provided with at least one lubrication hole extending axially therethrough.

6. A stator according to claim 4, wherein said plain bearings are made of a metal material selected from the group consisting of copper-base metal materials and aluminum-base metal materials.

* * * * *